United States Patent
Balasubramanian et al.

(10) Patent No.: US 9,154,539 B2
(45) Date of Patent: Oct. 6, 2015

(54) CONSOLIDATING EVENT DATA FROM DIFFERENT SOURCES

(75) Inventors: Viswanathan Balasubramanian, Issaquah, WA (US); Miguel A. Gonzalez, Redmond, WA (US); Gholamreza Assadi, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 429 days.

(21) Appl. No.: 13/052,714

(22) Filed: Mar. 21, 2011

(65) Prior Publication Data

US 2012/0246200 A1    Sep. 27, 2012

(51) Int. Cl.
G06F 17/30 (2006.01)
H04L 29/08 (2006.01)
G06F 21/55 (2013.01)

(52) U.S. Cl.
CPC .............. *H04L 67/02* (2013.01); *G06F 21/552* (2013.01); *H04L 67/146* (2013.01); *H04L 67/22* (2013.01); *G06F 2221/2151* (2013.01)

(58) Field of Classification Search
USPC .......................................... 707/809, 600–694
See application file for complete search history.

(56) References Cited

U.S. PATENT DOCUMENTS

| | | | |
|---|---|---|---|
| 7,020,869 B2 | 3/2006 | Abrari et al. | |
| 7,272,660 B1 | 9/2007 | Powers et al. | |
| 7,971,178 B1* | 6/2011 | Marwah et al. | 716/139 |
| 2003/0135827 A1 | 7/2003 | Kanzler et al. | |
| 2004/0122964 A1* | 6/2004 | Teh | 709/230 |
| 2010/0128598 A1* | 5/2010 | Gandhewar et al. | 370/217 |
| 2010/0161574 A1* | 6/2010 | Davidson et al. | 707/705 |
| 2011/0191312 A1* | 8/2011 | Gutlapalli et al. | 707/706 |

OTHER PUBLICATIONS

Rittman, Mark, "Deriving and Sharing Business Intelligence Metadata", Retrieved at << http://www.oracle.com/technetwork/issue-archive/2010/o40bi-082115.html >>, Retrieved Date: Dec. 28, 2010, pp. 4.

Russom, Philip, "Introduction to operational data integration", Retrieved at << http://tdwi.org/articles/2009/08/01/introduction-to-operational-data-integration.aspx >>, Aug. 1, 2009, pp. 2.

"Panorama", Retrieved at << http://www.panorama.com/webcasts/archives/2010/business-intelligence-for-powerpivot-apr-2010.html >>, Apr. 27, 2010, p. 1.

Wille, Allan, "Dashboard Mashup: Business Intelligence with Data Integration", Retrieved at << http://www.information-management.com/newsletters/BI_KPI_mashup_dashboard-10018813-1.html >>, Sep. 24, 2010, pp. 3.

(Continued)

*Primary Examiner* — Tony Mahmoudi
*Assistant Examiner* — Tuan-Khanh Phan
(74) *Attorney, Agent, or Firm* — Nicholas Chen; Kate Drakos; Micky Minhas

(57) ABSTRACT

Networked application event data associated with a session of a networked application is identified and provided to an event data collection system in one format. Web service event data associated with an event of a Web service and also associated with the session is also identified and provided to another event data collection system in another format. The networked application event data and the Web service event data associated with the session identifier are merged into a consolidated storage of event data in a common format.

26 Claims, 7 Drawing Sheets

(56) References Cited

OTHER PUBLICATIONS

"AAXIS Case Study: Business Intelligence Establishing an accurate view of the enterprise", Retrieved at << http://www.aaxischina.com/docs/AAXIS-Case-Studies-BusinessIntelligence.pdf >>, Retrieved Date: Dec. 29, 2010, p. 1-6.

"Oracle business intelligence", Retrieved at << http://download.oracle.com/docs/cd/B14099_19/core.1012/b13994/disco.htm >>, Retrieved Date: Dec. 29, 2010, pp. 11.

Jindal, et al., "Federated data warehouse architecture", Retrieved at << http://www.cio-leader.com/Federated%20Data%20Warehouse%20Architecture.pdf >>, Retrieved Date: Dec. 29, 2010, p. 1-8.

* cited by examiner

CONSOLIDATING EVENT DATA FROM DIFFERENT SOURCES

BACKGROUND

Computers and network connectivity have become increasingly commonplace, resulting in a large amount of content (e.g., products, services, other data, etc.) being available to users. Given the large amount of content that is available, it can be difficult for users to find content that is of interest to them. In order to improve the content available to users, as well as provide suggested content to users, content providers oftentimes attempt to track patterns of usage indicating how groups of users tend to behave. However, accurately tracking such usage patterns can be difficult to carry out.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in one or more devices event data associated with an event of a networked application corresponding to a networked application instrumentation module is received. This networked application event data is received from the networked application instrumentation module in a first format and is associated with a session identifier of a session of the networked application. Web service event data associated with an event of a Web service corresponding to a Web service instrumentation module is also received. The Web service event data is received from a Web service instrumentation module in a second format and is also associated with the session identifier. The networked application event data and the Web service event data associated with the session identifier are merged into a consolidated storage of event data in a common format.

In accordance with one or more aspects, networked application event data associated with a session of a networked application is identified and associated with a session identifier of the session. The networked application event data and associated session identifier are provided to an event data collection system. The session identifier is also provided to a Web service in response to a user request to access that Web service. The networked application event data and associated session identifier continue to be provided to the event data collection system while the Web service provides Web service event data to another event data collection system.

BRIEF DESCRIPTION OF THE DRAWINGS

The same numbers are used throughout the drawings to reference like features.

DETAILED DESCRIPTION

Consolidating event data from different sources is discussed herein. Event data describes the usage of a networked application (such as an application running in a Web browser or other client application) and/or Web service by a user. A session identifier is assigned to a current session of the user of the networked application. The user can also choose to log into a Web service, in which case the networked application provides the session identifier to the Web service. The networked application provides networked application event data, associated with the session identifier, to a collection system, and the Web service provides Web service event data, associated with the session identifier, to another collection system. The event data collected by the collection systems is then consolidated, including both the networked application event data from the networked application and the Web service event data from the Web service as associated with the same session of the user.

Figure 1:
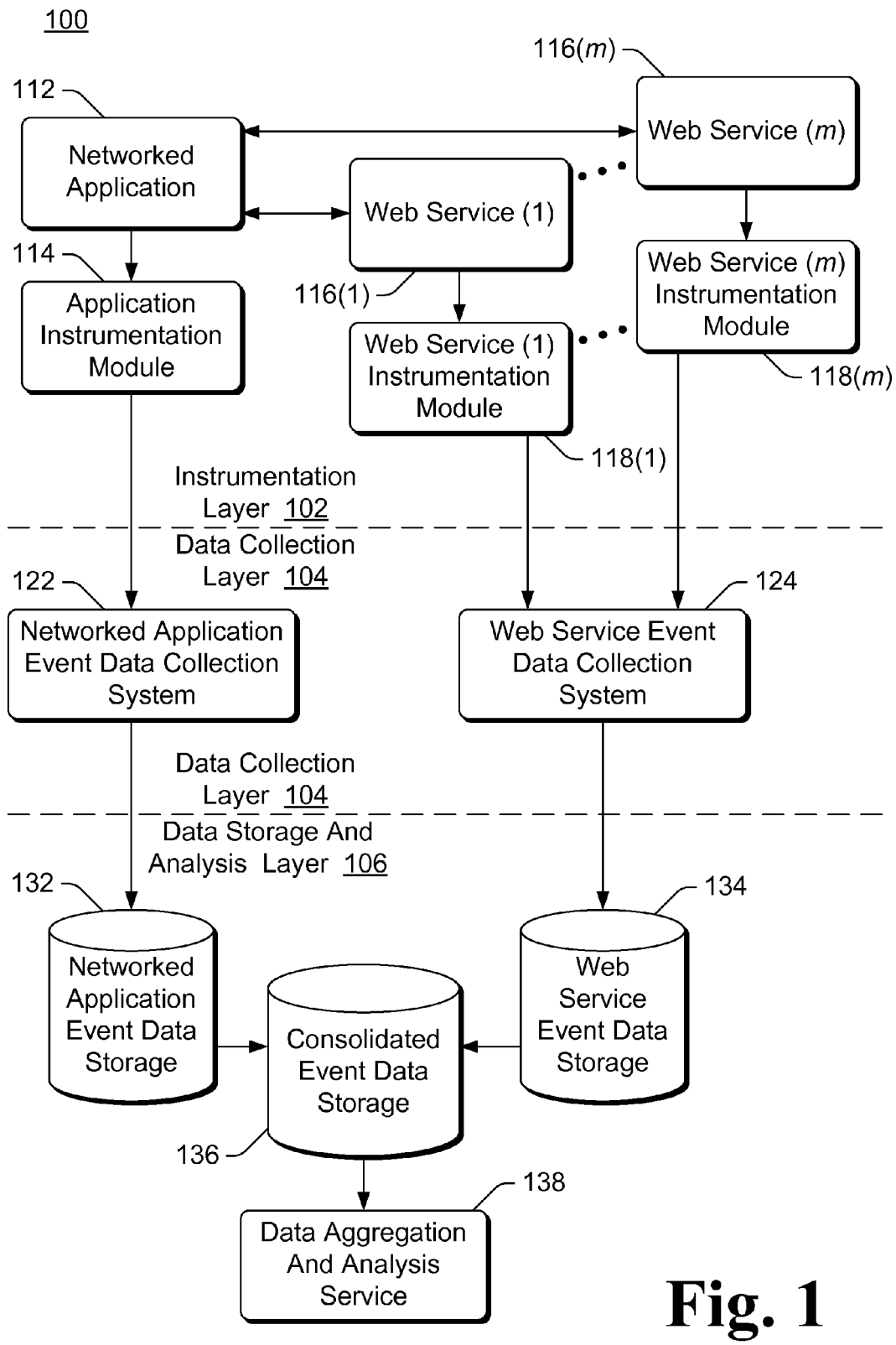
FIG. 1 illustrates an example system implementing the consolidating event data from different sources in accordance with one or more embodiments.

FIG. 1 illustrates an example system 100 implementing the consolidating event data from different sources in accordance with one or more embodiments. System 100 includes various modules, systems, and services organized into an instrumentation layer 102, a data collection layer 104, and a data storage and analysis layer 106. Generally, event data regarding a particular session is identified by modules in instrumentation layer 102 and provided to event data collection systems in data collection layer 104. The event data collection systems in data collections layer 104 receive the event data in different manners (e.g., via secure or unsecure communication channels) depending on the particular sources of the event data in instrumentation layer 102. The event data collection systems in data collections layer 104 store the received event data in a data storage and analysis layer 106. The event data from the different sources is consolidated and stored in a common format regardless of the sources from which the event data is received. Various analysis can then be performed using this consolidated event data.

In one more embodiments, the collecting of event data is performed only after receiving user consent to do so. This user consent can be an opt-in consent, where the user takes an affirmative action to request that the event data be collected before any collection of the event data is performed. Alternatively, this user consent can be an opt-out consent, where the user takes an affirmative action to request that the event data not be collected. If the user does not choose to opt out of collecting event data, then it is an implied consent by the user to collect event data.

Figure 2:
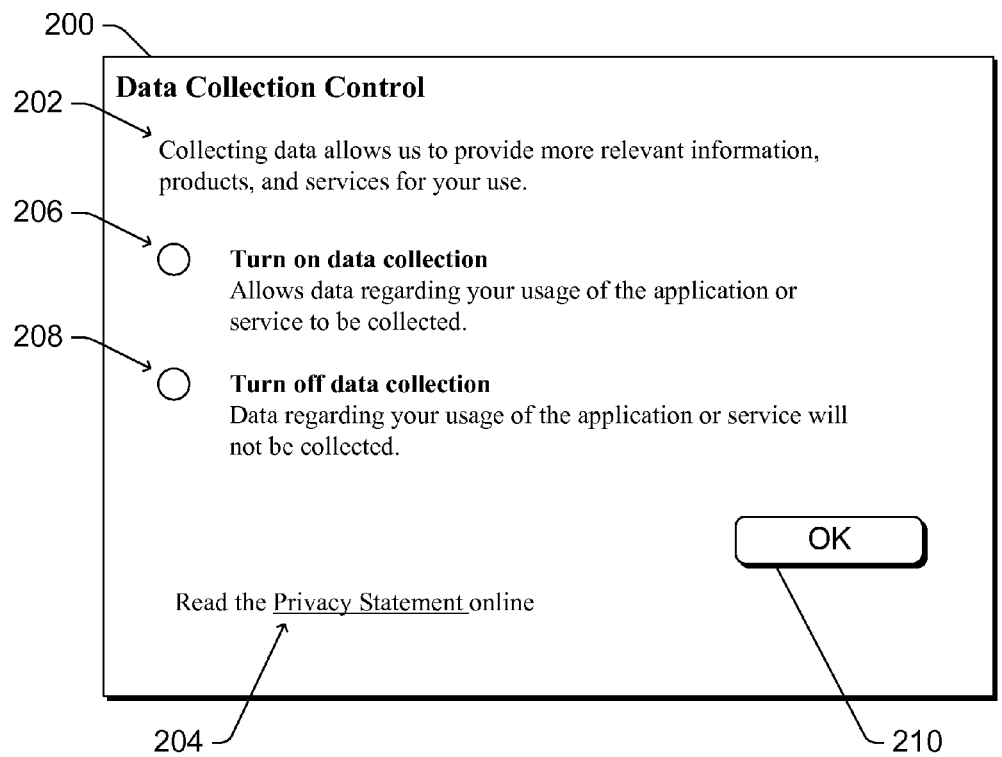
FIG. 2 illustrates an example user interface that can be displayed to a user to allow the user to select whether event data will be collected in accordance with one or more embodiments.

FIG. 2 illustrates an example user interface that can be displayed to a user to allow the user to select whether event data will be collected in accordance with one or more embodiments. A data collection control window 200 is displayed including a description 202 explaining to the user why event data is being collected. A link 204 to a privacy statement is also displayed. If the user selects link 204, a privacy statement is displayed, explaining to the user how the user's information is kept confidential.

Additionally, the user is able to select a radio button 206 to opt-in to the event data collection, or a radio button 208 to opt-out of the event data collection. Once a radio button 206 or 208 is selected, the user can select an "OK" button 210 to have the selection saved. It is to be appreciated that radio buttons and an "OK" button are only examples of user interfaces that can be presented to a user to opt-in or opt-out of the collecting of event data, and that a variety of other conventional user interface techniques can alternatively be used. Event data then proceeds to be collected or not collected in accordance with the user's selection.

Returning to FIG. 1, instrumentation layer 102 includes a networked application 112 and corresponding application instrumentation module 114. Application instrumentation module 114 can be implemented as part of networked application 112, or alternatively as another component or module that analyzes the operation of and/or is in communication with, networked application 112. A networked application 112 refers to an application running at least in part on a device, the application supporting or otherwise permitting access to a network from the application itself or from an associated application or module. Although a single networked application 112 is illustrated in instrumentation layer 102, it should be noted that multiple networked applications 112 (running on the same or different devices) can be included in instrumentation layer 102. Networked application 112 can be a variety of different types of applications, such as an entertainment application (e.g., a game, an audio and/or video playback application), a productivity application (e.g., a word processing application, a spreadsheet application), a reference application (e.g., a dictionary or encyclopedia application), an electronic store application (e.g., allowing users to shop for games, music, and/or videos), and so forth.

Application instrumentation module 114 identifies event data for networked application 112, also referred to as networked application event data. An event refers to an activity, setting, and/or other data of an application, service, and/or a device on which (or a system in which) an application or service is running. Event data refers to data associated with such an event. Application instrumentation module 114 is configured to identify any of a variety of different events and associated event data that are of interest (e.g., to a developer or distributor of networked application 112 and/or application instrumentation module 114) or are otherwise desired. Application instrumentation module 114 can be programmed with or otherwise obtain (e.g., from another component, module, and/or device) the events to be identified as well as how to identify such events. Different application instrumentation modules 114 can be configured to identify different and/or the same events for different networked applications 112.

For example, an event can be an activity, such as user selection of a particular option (e.g., a link, a button, etc.), a particular action or execution path taken in an application or service, a frequency with which a selection is made or an action is taken, a duration of a particular action or operation, and so forth. The event data associated with such an event is data describing the activity (e.g., the option selected, the action taken, the particular duration of an action, etc.). By way of another example, an event can be a setting, such as an operating system running an application, a screen display resolution of a device on which an application is run, a power or other resource usage setting of a device on which an application or service is run, a mode or other configuration setting of the networked application, and so forth. The event data associated with such an event is the particular data for that setting (e.g., a name and version of the operating system running an application, the particular screen display resolution of a device, etc.).

Instrumentation layer 102 also includes one or more (m) Web services 116, each having a corresponding Web service instrumentation module 118. A Web service instrumentation module 118 can be implemented as part of the corresponding Web service 116, or alternatively as another component or module that analyzes the operation of and/or is in communication with, the corresponding Web service 116. Web services 116 are implemented by one or more devices. Web services 116 can be accessed by networked application 112 and provide a user-specific service to the user of networked application 112. The user of networked application 112 logs into or otherwise authenticates himself or herself to a Web service 116, via networked application 112 or another application or interface. Web services 116 can provide a variety of different types of services, such as messaging services (e.g., e-mail, text messaging), social networking services, electronic store services (e.g., allowing users to purchase games, music, and/or videos), and so forth.

Each Web service instrumentation module 118 is configured to identify any of a variety of different events and associated event data that are of interest (e.g., to a developer or distributor of the corresponding Web service 116 and/or Web service instrumentation module 118) or are otherwise desired. Web service instrumentation module 118 can be programmed with or otherwise obtain (e.g., from another component, module, and/or device) the events to be identified as well as how to identify such events. Different Web service instrumentation modules 118 can be configured to identify different and/or the same events for different Web services 116.

Additionally, Web service instrumentation module 118 can identify the same types and/or different types of events as application instrumentation module 114 identifies. Because the user logs into or otherwise authenticates himself or herself to a Web service 116, the events can be user-specific settings. For example, settings such as a user's age, gender, geographic location, interests, and so forth can have been previously received from the user to the Web service 116 (e.g., when he or she registered with Web service 116 to establish an account with the Web service 116 or updated an account), and the presence of such settings can be an event.

Figure 3:
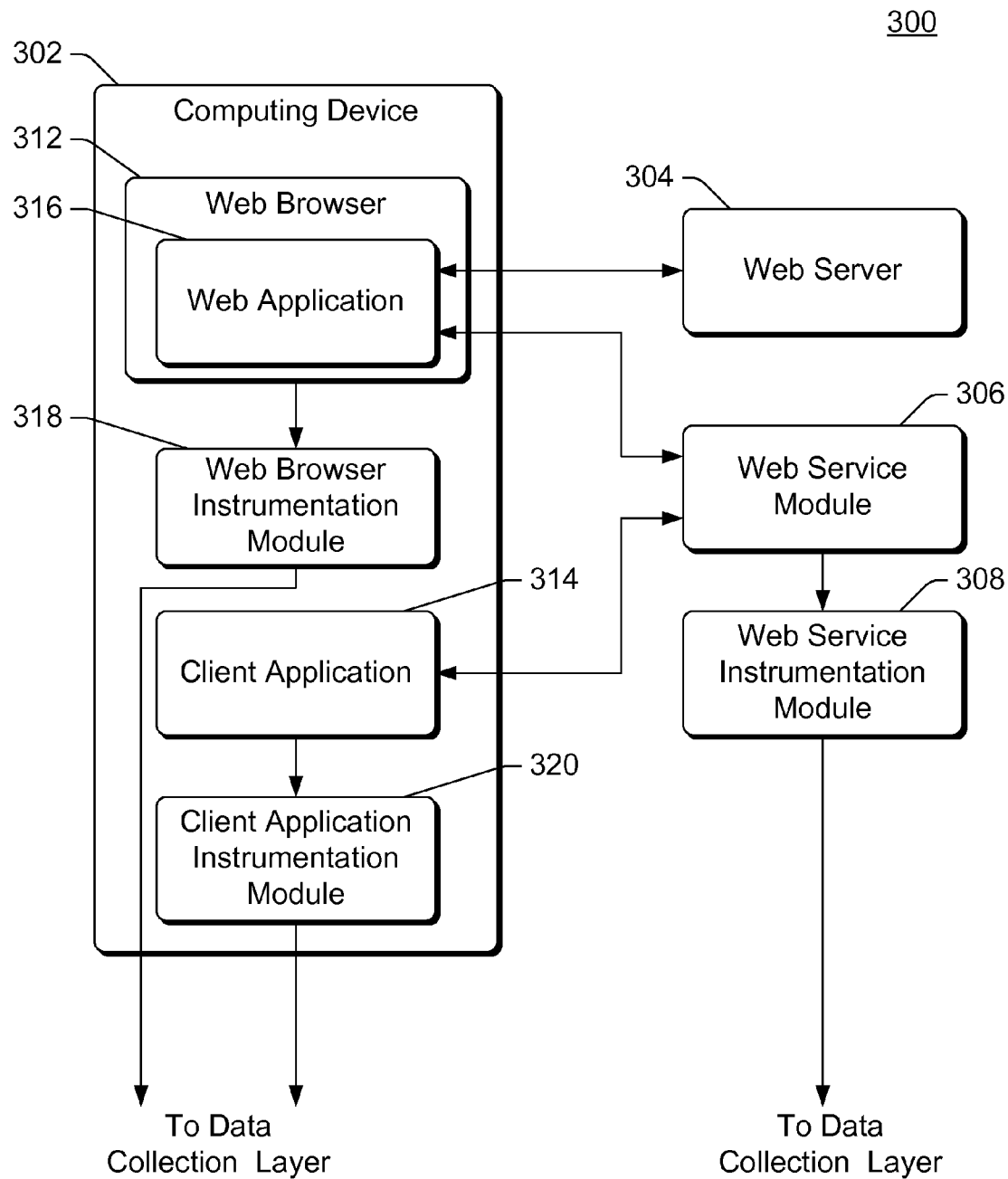
FIG. 3 illustrates an example system implementing at least part of an instrumentation layer in accordance with one or more embodiments.

FIG. 3 illustrates an example system 300 implementing at least part of an instrumentation layer in accordance with one or more embodiments. System 300 can implement, for example, at least part of instrumentation layer 102 of FIG. 1. System 300 includes a computing device 302, a Web server 304, a Web service module 306, and a Web service instrumentation module 308. Web service module 306 can be, for example, a Web service 116 of FIG. 1, and Web service instrumentation module 308 can be, for example, a corresponding Web service instrumentation module 118 of FIG. 1.

Computing device 302 can be a variety of different types of devices. For example, computing device 302 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Similarly, Web server 304 can be a variety of different types of devices, and Web service module 306 and Web service instrumentation module 308 can be implemented by a variety of different types of devices.

Computing device 302 includes a Web browser 312 and a client application 314, each of which can be a networked application (e.g., networked application 112 of FIG. 1). Web browser 312 obtains a Web application 316 from Web server 304. The Web browser 312 has a corresponding Web browser instrumentation module 318 that identifies event data for Web browser 312 and Web application 316 and provides that event data to the data collection layer. Web application 316 can be an application that is downloaded from Web server 304 and run on computing device 302, processing inputs and providing responses itself. Alternatively, Web application 316 can be an application providing an interface to receive input from a user of computing device 302 and provide that input to Web server 304 for processing. Alternatively, Web application 316 itself can be a networked application and instrumentation module 318 can correspond to Web application 316 rather than Web browser 312.

Similarly, client application 314 is an application running on computing device 302 and has a corresponding client application instrumentation module 320. Client application instrumentation module 320 identifies event data for client application 314 and provides that event data to the data collection layer.

It should be noted that Web server 304 is distinct from Web service module 306. Web server 304 provides Web application 316 to computing device 302. Web service module 306, on the other hand, provides a service that is made available to Web application 316 running on computing device 302 or is made available to Web server 304 (e.g., in situations in which Web application 316 is an interface providing user inputs to Web server 304 for processing).

Communication between computing device 302 and Web server 304 as well as between computing device 302 and Web service module 306 can be carried out using a variety of different networks. For example, such communication can be carried out via the Internet, a local area network (LAN), a phone or other wireless network, an intranet, other public and/or proprietary networks, combinations thereof, and so forth.

Returning to FIG. 1, session identifiers are assigned to sessions of usage, by one or more users, of networked application 112. A session begins when networked application 112 begins running, or alternatively when the previous session ends. A session ends when networked application 112 is closed, or after a threshold amount of time of inactivity in networked application 112 is detected. For example, a session can end when no user inputs to networked application 112 are received for at least 30 minutes. Alternatively, sessions can be defined as beginning and/or ending in other manners, such as based on particular user inputs, based on particular periods or intervals of time, and so forth.

A session identifier can be an alphanumeric or other value allowing different sessions to be distinguished from one another within system 100. For example, a session identifier can be a Globally Unique Identifier (GUID). The session identifier can be assigned by different components or modules, such as application instrumentation module 114, networked application 112, and so forth.

The session identifier is known to application instrumentation module 114, whether having been generated by module 114 or otherwise provided to or obtained by module 114. Application instrumentation module 114 associates the session identifier of the current session of networked application 112 with the event data that module 114 identifies. Additionally, in one or more embodiments a timestamp (e.g., date and time) of when the associated event occurred is generated and recorded by application instrumentation module 114. When the event occurred can be, for example, a date and time when the data was identified by module 114, a date and time when the event data associated with an event that occurred is recorded by module 114, and so forth. Maintaining the timestamp allows a record of the order in which events occurred to be maintained and used as desired during subsequent analysis. Alternatively, rather than a timestamp, other indicators of the order in which events occurred can be maintained, such as a number or other series of values that is incremented or otherwise advanced in response to an event being identified.

Application instrumentation module 114 provides the event data that module 114 identifies, as well as the associated session identifier and timestamp, to networked application event data collection system 122 in data collection layer 104. The data can be communicated via a variety of different types of networks (e.g., the Internet, a LAN, a phone or other wireless network, an intranet, other public and/or proprietary networks, combinations thereof, and so forth). Application instrumentation module 114 typically communicates data to collection system 122 via an unsecured communication channel, although a secure communication channel can alternatively be used. An unsecured communication channel refers to a communication channel that is not encrypted or otherwise secured against potential eavesdroppers.

The event data that application instrumentation module 114 identifies and provides to data collection system 122, referred to as networked application event data, can also be referred to as anonymous event data because the event data includes no user-specific data. Although a session identifier is associated with the event data, and the event data may include information regarding settings of networked application 112 and/or a device on which networked application 112 is running, the event data provided by module 114 is not specific to a particular user. Application instrumentation module 114 excludes from the event data it provides to data collection system 122 an identifier of the user of networked application 112 or other user-specific data. Furthermore, the event data identified and provided by application instrumentation module 114 may actually be event data collected from multiple different users of networked application 112 during a particular session.

The networked application event data can be provided by application instrumentation module 114 to networked application event data collection system 122 in a variety of different public and/or proprietary formats. This format refers to the manner in which the event data is indicated, the manner in which the associated session identifier is indicated, the manner in which the associated timestamp is indicated, whether event data is provided separately for each identified event or whether event data for multiple events are batched together, that the communication channel is an unsecure communication channel, and so forth. Furthermore, different application instrumentation modules 114 can use different formats. Although various different formats can be used, both application instrumentation module 114 and networked application event data collection system 122 are aware of the particular format or formats being used.

Additionally, while using networked application 112, a user can input a request to log into or otherwise access a Web service 116. For example, a user of networked application 112 can desire to send a message to a friend using networked application 112 and requests to log into a Web service 116 allowing such a message to be sent. By way of another example, a user of networked application 112 browsing an electronic store can desire to purchase a game or music file and requests to log into a Web service 116 allowing such a purchase to be made.

Networked application 112 and the Web service 116 communicate with one another to allow the requested service to be provided to the user in a conventional manner. However, in addition to such communication, networked application 112 also provides to Web service 116 the session identifier for the current session of networked application 112. If the current session changes while the user is still logged into Web service 116 and networked application 112 is running, networked application 112 provides the new session identifier to Web service 116.

In addition to providing the session identifier, in one or more embodiments networked application 112 also provides a current timestamp to Web service 116. This timestamp is generated based on the same clock as is used by application instrumentation module 114. Alternatively, if another indicator other than a timestamp is used by application instrumentation module 114 as discussed above, then this other indicator is provided to Web service 116 rather than a timestamp. Web service 116 provides this timestamp or other indicator to the corresponding Web service instrumentation module 118, allowing that module 118 to synchronize its timestamps (e.g., based on the clock module 118 is using) to the timestamps being provided by application instrumentation module 114 to networked application event data collection system 122. Thus, based on the timestamps associated with event data from application instrumentation module 114 and event data from Web service instrumentation module 118, a determination can be made as to which event occurred earlier in time.

The Web service instrumentation module 118 corresponding to the Web service 116 that the user logged into provides the event data that it identifies, as well as the associated session identifier (received from networked application 112) to Web service event data collection system 124. Web service instrumentation module 118 can also generate a timestamp (or other indicator) of when the associated event occurred in a manner analogous to the timestamp (or other indicator) generated by application instrumentation module 114 discussed above, and provide the associated timestamp for the event data to Web service event data collection system 124. The data can be communicated via a variety of different types of networks (e.g., the Internet, a LAN, a phone or other wireless network, an intranet, other public and/or proprietary networks, combinations thereof, and so forth).

The event data that Web service instrumentation module 118 identifies and provides to data collection system 124 is also referred to as Web service event data. The Web service event data can include user-specific data, such as a user's age, gender, and so forth. Web service instrumentation module 118 has access to (e.g., by virtue of the user having logged into the corresponding Web service 116) user-specific data for the current user of networked application 112 (e.g., the user that logged into the corresponding Web service 116). In addition to (or in place of) user-specific data, the Web service event data can be other types of networked application event data. For example, the Web service event data can be billing data (e.g., data regarding the market that a user is in, a price of an item being purchased by the user, a currency in which the item is being purchased, special offers presented to and/or accepted by a user in purchasing an item, etc.). By way of further example, the Web service event data can be metadata regarding an item that is the subject of a transaction (e.g., purchase, rental, free trial, etc.), such as the name of the developer of the item, a category assigned to the item, a type of the item, and so forth.

It should be noted that the Web service event data that Web service instrumentation module 118 provides to Web service event data collection system 124 need not be revealed to, and typically is not revealed to, networked application 112. Rather, the Web service event data is provided from Web service instrumentation module 118 to Web service event data collection system 124 without needing to be provided to or maintained by a device implementing networked application 112. Similarly, the networked application event data that application instrumentation module 114 provides to networked application event data collection system 122 need not be revealed to, and typically is not revealed to, Web service 116. Rather, the networked application event data is provided from application instrumentation module 114 to networked application event data collection system 122 without needing to be provided to or maintained by Web service 116. Thus, networked application 112 typically has no knowledge of the Web service event data that Web service instrumentation module 118 provides to Web service event data collection system 124, and Web service 116 typically has no knowledge of the networked application event data that application instrumentation module 114 provides to networked application event data collection system 122.

Web service instrumentation module 118 typically communicates the Web service event data to collection system 124 via a secure communication channel. A secure communication channel is a communication channel that is encrypted or otherwise protected against potential eavesdroppers. Such a secure communication channel can be implemented in a variety of different manners. In one or more embodiments, the secure communication channel is implemented by encrypting (e.g., using well-known symmetric or public key encryption techniques) the data sent via the channel. In other embodiments, the secure communication channel is implemented by locating Web service instrumentation module 118 and Web service event data collection system 124 in the same secure facility, allowing communication between module 118 and system 124 to occur unencrypted yet still be inaccessible to potential eavesdroppers external to the facility.

The Web service event data can be provided by Web service instrumentation modules 118 to Web service event data collection system 124 in a variety of different public and/or proprietary formats. This format refers to the manner in which the event data is indicated, the manner in which the associated session identifier is indicated, the manner in which the associated timestamp is indicated, whether event data is provided separately for each identified event or whether event data for multiple events are batched together, the manner in which the secure communication channel is implemented, and so forth. Furthermore, different Web service instrumentation modules 118 can use different formats. Although various different formats can be used, both Web service instrumentation modules 118 and Web service event data collection system 124 are aware of the particular format or formats being used.

Thus, networked application 112 (and/or corresponding application instrumentation module 114) is one source of event data that is provided to data collection layer 104, providing networked application event data to data collection layer 104. Web service 116 (and/or corresponding Web service instrumentation module 118) is another source of event data that is provided to data collection layer 104, providing Web service event data to data collection layer 104. These sources are heterogeneous sources as modules 114 and 118 are designed to identify event data for their respective corresponding networked application or Web service. Modules 114 and 118 (including different modules 118) can operate in different manners, identifying different event data using different techniques, and providing their identified event data using different formats. However, regardless of the sources of the event data, event data that is identified during a particular session has the same session identifier. Thus, the various event data from the various sources can be readily consolidated and identified as part of the same session due to the common session identifier.

Similarly, networked application event data collection system 122 and Web service event data collection system 124 are designed to received event data provided by application instrumentation module 114 and Web service instrumentation module 118, respectively. Thus, systems 122 and 124 in data collection layer 104 receive data in different manners from different sources. Furthermore, although a single system 122 and a single system 124 are illustrated in data collection layer 104, alternatively multiple systems 122 and/or multiple systems 124 can be included in data collection layer 104. Different networked application event data collection systems 122 can receive data from different application instrumentation modules 114 (optionally using different formats), and different Web service event data collection systems 124 can receive data from different Web service instrumentation modules 118 (optionally using different formats).

Data storage and analysis layer 106 includes networked application event data storage 132, Web service event data storage 134, and consolidated event data storage 136. Storage 132, 134, and 136 can be implemented by the same or different storage devices, and can be implemented using a variety of different storage devices (e.g., one or more magnetic disks, one or more optical discs, Flash memory, etc.). Networked application event data collection system 122 stores event data that system 122 receives from application module 114 in networked application event data storage 132. Similarly, Web service event data collection system 124 stores event data that system 124 receives from Web service instrumentation modules 118 in Web service event data storage 134.

Event data stored in networked application event data storage 132 and Web service event data storage 134 is merged together and stored in consolidated event data storage 136. Thus, consolidated event data storage 136 stores event data obtained from various different sources, and includes both networked application event data and Web service event data. The event data from a particular session of networked application 112, however, is associated with the same session identifier even though the event data is received from different sources. Furthermore, as the event data has associated timestamps, and these timestamps are synchronized as discussed above, a determination of the particular order in which events occurred can be determined even though the event data is received from different sources.

In one or more embodiments, the event data stored in consolidated event data storage 136 is expanded to include event data from other events having the same session identifier. This expansion includes expanding the event to include event data from other events collected by system 122 and/or system 124. The other types of events and/or the event data from other events that are to be included in event data for a particular event can be specified by a set of rules or other criteria (e.g., obtained from an administrator or user of data storage and analysis layer 106). This expansion can be performed by, for example, data aggregation and analysis service 138 or another component or module of data storage and analysis layer 106. Thus, even though particular event data may not have been identified by the instrumentation module 114 or 118 for a particular event, that event data can be included as part of the event data for the event in consolidated event data storage 136.

By way of an example of this expansion, a particular rule can indicate that events received from system 122 having a particular session identifier be expanded in consolidated event data storage 136 to include user information event data from events received from system 124 having that same particular session identifier. By way of another example, a particular rule can indicate that events received from system 122 having a particular session identifier be expanded in consolidated event data storage 136 to include location event data from one or more other events received from system 122 having that same particular session identifier.

The event data is stored in consolidated event data storage 136 in a common format, regardless of the formats in which event data is received by collection systems 122 and 124. In one or more embodiments, the event data received by collection systems 122 and 124 is converted to this common format by systems 122 and 124 prior to the storage of the event data in event data storage 132 and 134, respectively. The conversion can be performed by collection systems 122 and 124, and/or by another component or module (not shown). Alternatively, collection systems 122 and 124 can store the event data in event data storage 132 and 134 in the format in which it is received from instrumentation modules 114 and 118, and a component or module of data storage and analysis layer 106 converts the event data from the format in which it is stored in event data storage 132 and 134 into the common format for storage in consolidated event data storage 136. This conversion can be performed by data aggregation and analysis service 138, and/or by another component or module (not shown).

In one or more embodiments, the common format in which event data is stored in consolidated event data storage 136 is a set of name-value pairs. The name refers to an identifier or description of the event or event data, and the value refers to the event data itself. The session identifier and/or timestamp associated with the event data can be stored as part of the name-value pair (e.g., included as part of the value). Alternatively, the name-value pairs can be stored in a manner in which the session identifier and/or timestamp is inherently associated with the name-value pairs. For example, a file, table, or other data structure can include the session identifier for all name-value pairs included in that file, table, or a data structure. By way of another example, a table or other data structure can have timestamps inherent in its organization and the name-value pairs stored in the appropriate location within that table or other data structure so as to associate the name-value pairs with the appropriate timestamps.

The particular component, module, or system performing the conversion of the event data into the common format is configured with (e.g., programmed with) or otherwise obtains an indication of how to convert the event data in the format in which the event data is received by collection systems 122 and 124 into the common format. The specific manner in which the event data is converted from the format in which the event data is received by collection systems 122 and 124 into the common format can vary based on the particular formats being used. For example, networked application event data received by collection system 122 can have a particular code identifying the type of the event data, and this particular code can be converted into the appropriate name for a name-value pair including that event data. By way of another example, Web service event data received by collection system 124 can include event data sent in a particular ordering in which the type of event data is inherent in the ordering. The component, module, or system performing the conversion knows this ordering, and can readily convert the event data into the appropriate name-value pairs.

It should be noted that name-value pairs are an example of the format in which event data is stored consolidated event data storage 136, and that the event data can alternatively be stored in other manners, using other formats or structures, and so forth.

Additionally, it should be noted that system 100 is extensible, supporting the addition of new event data and/or new sources of event data. For example, a new instrumentation module in instrumentation layer 102 may define a new event which can be added as a new name for name-value pairs in consolidated data storage 136. By way of another example, a new event data collection system can be added to data collection layer 104 to support a new instrumentation module 118 or 114 added to instrumentation layer 102.

Data aggregation and analysis service 138 is implemented by one or more of a variety of different types of devices. Data aggregation and analysis service 138 accesses the event data in consolidated event data storage 136 and can analyze the event data and/or perform various data mining based on the event data in a variety of different manners. For example one or more reports can be generated to identify usage patterns for particular types (e.g., by age group or geographic location) of users. By way of another example, applications that are purchased more frequently than others or that are used for extended periods of time by particular types of users can be readily identified based on the event data in consolidated event data storage 136.

Figure 4:
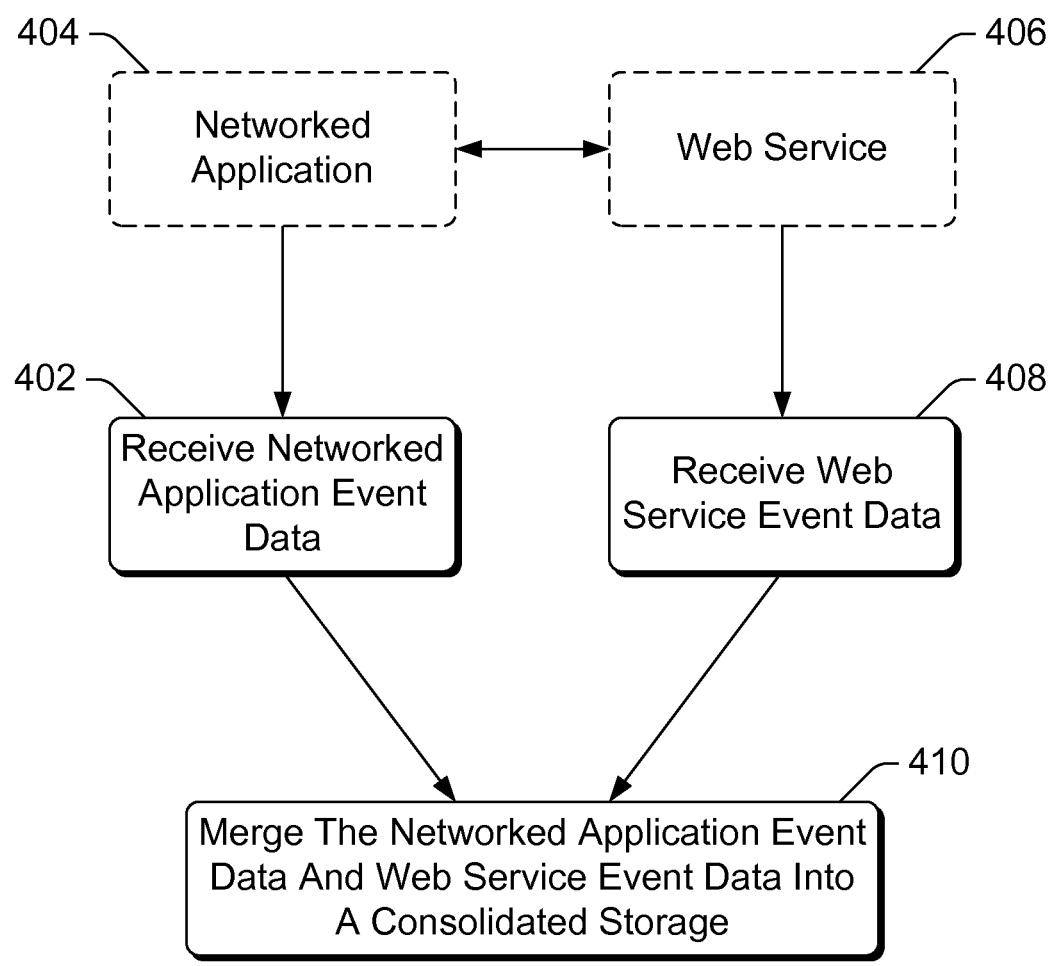
FIG. 4 is a flowchart illustrating an example process for consolidating event data from different sources in accordance with one or more embodiments.

FIG. 4 is a flowchart illustrating an example process 400 for consolidating event data from different sources in accordance with one or more embodiments. Process 400 can be implemented in software, firmware, hardware, or combinations thereof. Process 400 is shown as a set of acts and is not limited to the order shown for performing the operations of the various acts. Process 400 is an example process for consolidating event data from different sources; additional discussions of consolidating event data from different sources are included herein with reference to different figures.

In process 400, networked application event data is received (act 402) from a networked application 404. The networked application event data can have an associated session identifier and timestamp, and is received in a particular format based on the networked application instrumentation module corresponding to networked application 404 as discussed above. This associated session identifier is also communicated to a Web service 406 as discussed above.

Web service event data is received (act 408) from Web service 406. The Web service event data can also have an associated session identifier and timestamp, and is received in a particular format based on the Web service instrumentation module corresponding to Web service 406 as discussed above.

The networked application event data received in act 402 and the Web service event data received in act 408 are merged into a consolidated storage (act 410). The networked application event data and Web service event data are converted from the particular formats in which they are received to a common format, as discussed above.

Figure 5:
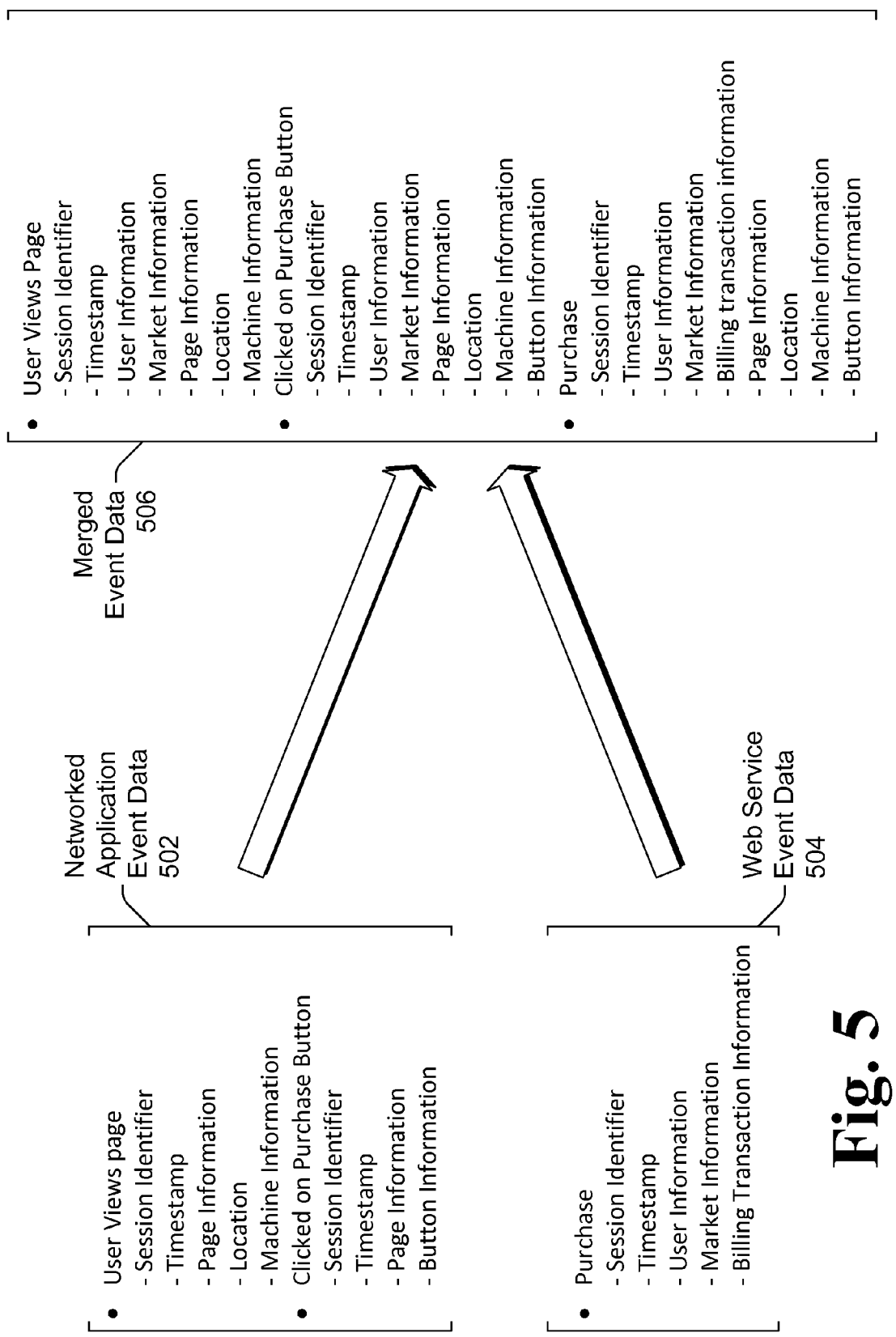
FIG. 5 illustrates an example merging of event data in accordance with one or more embodiments.

FIG. 5 illustrates an example merging of event data in accordance with one or more embodiments. In the example of FIG. 5, networked application event data 502 and Web service event data 504 are merged together to generate merged event data 506. Networked application event data 502 is received from a networked application (e.g., in act 402 of FIG. 4), and Web service event data 504 is received from a Web service (e.g., in act 408 of FIG. 4). The events in networked application event data 502 and Web service event data 504 were identified during the same session, and thus have the same session identifier.

Networked application event data 502 includes data for two events: a "user views page" event (e.g., identified when a page is displayed) and a "clicked on purchase button" event (e.g., identified when a user clicks on or otherwise activates a purchase button for an item). For the "user views page" event, the event data includes the session identifier, a timestamp of when the event occurred, page information (e.g., an address or other identifier of the page displayed), a location (e.g., a geographical area where the device displaying the page is located), and machine information (e.g., characteristics of the device displaying the page). For the "clicked on purchase button" event, the event data includes the session identifier, a timestamp of when the event occurred, page information (e.g., an address or other identifier of the page displayed when the button was activated), and button information (e.g., information describing the button that was activated or the manner in which the button was activated).

Web service event data 504 includes data for a "purchase" event (e.g., identified when a user purchases an item). For the "purchase" event, the event data includes the session identifier (as received from the networked application as discussed above), a timestamp of when the event occurred, user information (e.g., user-specific data regarding the user purchasing the item), market information (e.g., information regarding where the item is purchased), and billing transaction information (e.g., information regarding a method of payment used to purchase the item).

Merged event data 506 includes the consolidated event data from networked application event data 502 and Web service event data 504. Thus, merged event data 506 includes a "user views page" event, a "clicked on purchase button" event, and a "purchase" event. Each of these events in merged event data 506 includes the same session identifier, and also includes the individual event data that was received as networked application event data 502 or Web service event data 504. Thus, the "clicked on purchase button" event in merged event data 506 includes the session identifier, timestamp, page information, and button information event data received as networked application event data 502.

Furthermore, each of the events in merged event data 506 is expanded to include event data received from other events in networked application event data and/or Web service event data 504. For example, the "clicked on purchase button" event data in merged event data 506 also includes user information event data (e.g., obtained from the "purchase" event) and location event data (e.g., obtained from the "user views page" event). By way of another example, the "purchase" event includes location event data (e.g., obtained from the "user views page" event) and button information event data (e.g., obtained from the "clicked on purchase button" event).

Figure 6:
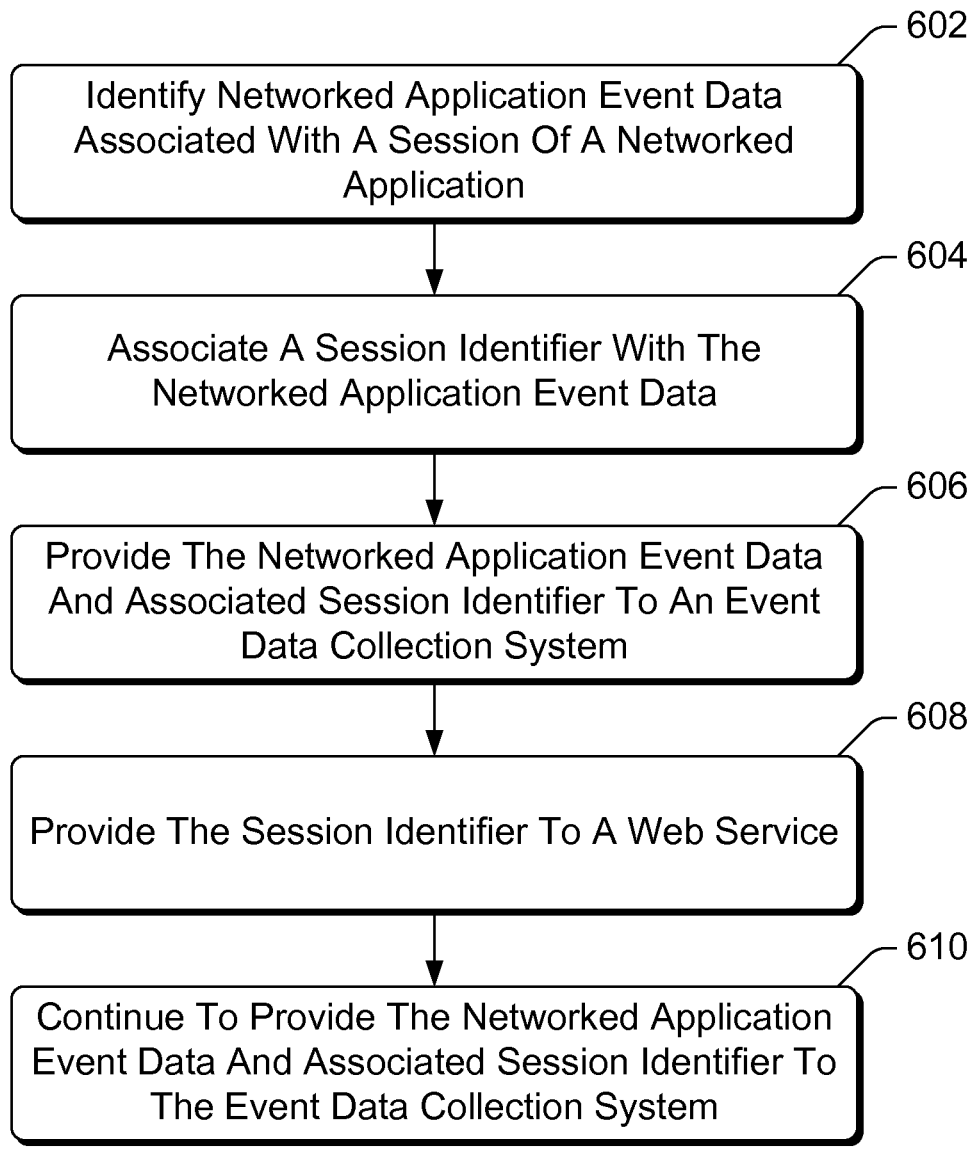
FIG. 6 is a flowchart illustrating an example process for providing event data for consolidation from different sources in accordance with one or more embodiments.

FIG. 6 is a flowchart illustrating an example process 600 for providing event data for consolidation from different sources in accordance with one or more embodiments. Process 600 can be implemented in software, firmware, hardware, or combinations thereof. Process 600 is shown as a set of acts and is not limited to the order shown for performing the operations of the various acts. Process 600 is an example process for providing event data for consolidation from different sources; additional discussions of providing event data for consolidation from different sources are included herein with reference to different figures.

In process 600, networked application event data associated with a session of a networked application is identified (act 602). The networked application event data is identified by a network application instrumentation module as discussed above.

A session identifier of the session is associated with the networked application event data (act 604). The session identifier allows different sessions to be distinguished from one another, and the duration of a session can vary as discussed above.

The networked application event data and the associated session identifier are provided to an event data collection system (act 606). A timestamp of the event associated with the networked application event data can also be provided to the event data collection system as discussed above.

The session identifier is also provided to a Web service (act 608). Providing the session identifier to the Web service allows the Web service to provide Web service event data to a Web service event data collection system as discussed above.

The networked application event data and the associated session identifier also continue to be provided to the event data collection system (act 610). The networked application event data and associated session identifier can be provided to the event data collection system concurrently with the Web service to which the session identifier was provided providing the Web service event data to the Web service event data collection system.

Figure 7:
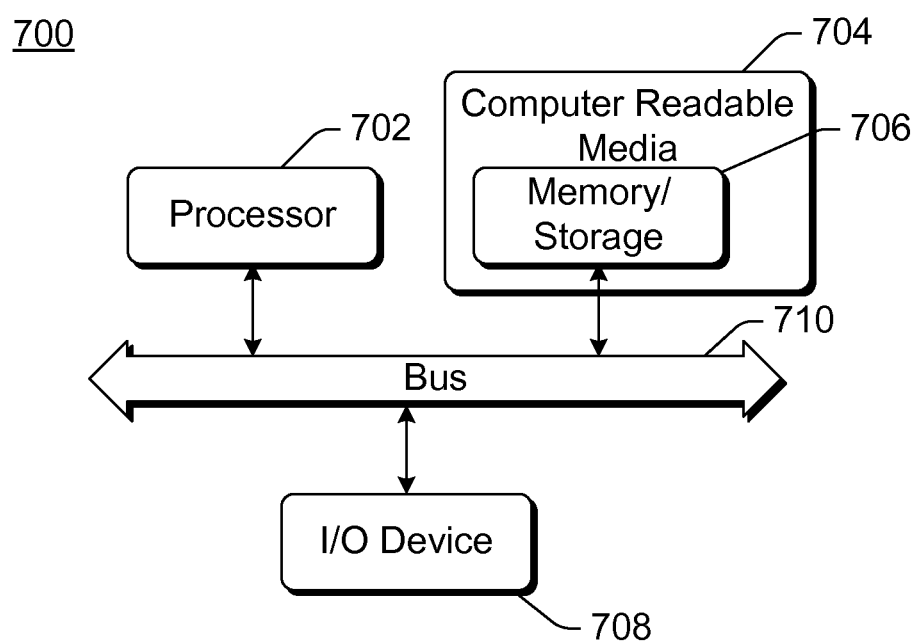
FIG. 7 illustrates an example computing device that can be configured to implement the consolidating event data from different sources in accordance with one or more embodiments.

FIG. 7 illustrates an example computing device 700 that can be configured to implement the consolidating event data from different sources in accordance with one or more embodiments. Computing device 700 can be, for example, computing device 302 of FIG. 3 or implement at least part of Web server 304, Web service module 306, and/or Web service instrumentation module 308 of FIG. 3, or can implement at least part of one or more of the various modules, systems, storages, applications, and/or services of FIG. 1.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or one or more I/O devices 708 can be included as part of, or alternatively may be coupled to, computing device 700. Bus 710 represents one or more of several types of bus structures, including a memory bus or memory controller, a peripheral bus, an accelerated graphics port, a processor or local bus, and so forth using a variety of different bus architectures. Bus 710 can include wired and/or wireless buses.

Memory/storage component 706 represents one or more computer storage media. Component 706 can include volatile media (such as random access memory (RAM)) and/or non-volatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 702. It is to be appreciated that different instructions can be stored in different components of computing device 700, such as in a processing unit 702, in various cache memories of a processing unit 702, in other cache memories of device 700 (not shown), on other computer readable media, and so forth. Additionally, it is to be appreciated that the location where instructions are stored in computing device 700 can change over time.

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 7. The features of the consolidating event data from different sources techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in one or more devices, the method comprising:
   receiving, in a first format from a networked application instrumentation module, networked application event data associated with an event of a networked application corresponding to the networked application instrumentation module, the networked application event data also being associated with a session identifier of a session of the networked application;
   receiving, in a second format from a Web service instrumentation module, Web service event data associated with an event of a Web service corresponding to the Web service instrumentation module, the Web service event data also being associated with the session identifier, the second format being a different format than the first format; and
   merging, into a consolidated storage of event data in a common format comprising text, the networked application event data and the Web service event data associated with the session identifier, including storing:
      a value from the networked application event data under a Web service event data name; or
      a value from the Web service event data under a networked application event data name.

2. A method as recited in claim 1, wherein the first format includes receiving the networked application data via an unsecure communication channel, and the second format includes receiving the Web service event data via a secure communication channel.

3. A method as recited in claim 1, wherein the Web service event data includes data previously received from the user as part of establishing an account with the Web service.

4. A method as recited in claim 1, wherein the networked application instrumentation module identifies event data associated with first events, the Web service instrumentation module identifies event data associated with second events, the first events and second events being different events.

5. A method as recited in claim 1, wherein the networked application comprises a client application running on one of the one or more devices.

6. A method as recited in claim 1, wherein the networked application comprises a Web application running in a Web browser of one of the one or more devices.

7. A method as recited in claim 1, the session identifier having been provided to the Web service by the networked application.

8. A method as recited in claim 1, further comprising converting the networked application event data received in the first format into the common format, and converting the Web service event data received in the second format to the common format.

9. A method as recited in claim 8, the common format comprising name-value pairs in which for networked application event data the name is an identifier of the networked application event data and the value is the networked application event data, and for Web service event data the name is an identifier of the Web service event data and the value is the Web service event data.

10. A method as recited in claim 1, further comprising:
   receiving, in a third format from an additional Web service instrumentation module, additional Web service event data associated with an event of an additional Web service corresponding to the additional Web service instrumentation module, the additional Web service event data also being associated with the session identifier, the third format being different from the first format and the second format; and
   the merging further comprising merging, into the consolidated storage of event data in the common format, the additional Web service event data associated with the session identifier.

11. A method as recited in claim 1, further comprising:
   receiving, in the second format from an additional Web service instrumentation module, additional Web service event data associated with an event of an additional Web service corresponding to the additional Web service instrumentation module, the additional Web service event data also being associated with the session identifier; and
   the merging further comprising merging, into the consolidated storage of event data in the common format, the additional Web service event data associated with the session identifier.

12. A method as recited in claim 1, further comprising supporting adding additional instrumentation modules identifying additional events, and the merging comprising merging, into the consolidated storage of event data in the common format, event data associated with the additional events.

13. One or more computer hardware storage media having stored thereon multiple instructions that, when executed by one or more processors of one or more devices, cause the one or more processors to:
   identify networked application event data associated with a session of a networked application;
   associate, in at least one of the one or more devices, a session identifier of the session with the networked application event data;
   provide, to a first event data collection system, the networked application event data and associated session identifier;
   provide, to a Web service, the session identifier in response to a user request to access the Web service;
   continue to provide the networked application event data and associated session identifier to the first event data collection system while the Web service provides Web service event data to a second event data collection system; and
   consolidate the networked application event data and Web service event data in a third event data collection system when the networked application event data and the Web service event data are associated with a same session identifier by at least:
      associating an item of the networked application event data with a Web service event, the item of the networked application event data not previously included in Web service event data associated with the Web service event; and
      associating an item of the Web service event data with a networked application event, the item of the Web service event data not previously included in networked application event data associated with the networked application event.

14. One or more computer hardware storage media as recited in claim 13, the multiple instructions further causing the one or more processors to provide, as associated with the networked application event data, a timestamp of when an event associated with the networked application event data occurred.

15. One or more computer hardware storage media as recited in claim 13, the networked application event data excluding an identifier of a user of the networked application.

16. One or more computer hardware storage media as recited in claim 13, wherein the networked application comprises a client application running on one of the one or more devices.

17. One or more computer hardware storage media as recited in claim 13, wherein the networked application comprises a Web application running in a Web browser of one of the one or more devices.

18. One or more computer hardware storage media as recited in claim 13, the multiple instructions further causing the one or more processors to determine, after a threshold amount of time of inactivity of the networked application is detected, that the session ends, that a new session begins, and that a new session identifier is to be assigned to the new session.

19. One or more computer hardware storage media as recited in claim 13, the multiple instructions further causing the one or more processors to continue to provide the networked application event data to the event data collection system despite having no knowledge of the Web service event data being provided by the Web service.

20. A method implemented in one or more devices, the method comprising:
    receiving, in a first format from a networked application instrumentation module and at a networked application event data collection system implemented by at least one of the one or more devices, networked application event data and both a session identifier of a current session of a networked application when a first event corresponding to the networked application event data occurred and a timestamp indicating when the first event occurred;
    receiving, in a second format from a Web service instrumentation module and at a Web service event data collection system implemented by at least one of the one or more devices, Web service event data and both the session identifier of the current session of the networked application when a second event corresponding to the Web service event data occurred and a timestamp of when the second event occurred, the session identifier having been received by the Web service from the networked application, the second format being a different format than the first format;
    merging the networked application event data and the Web service event data associated with the session identifier into a consolidated storage of event data, the consolidated storage using a common name-value pair format in which for the networked application event data the name is an identifier of the networked application event data and the value is the networked application event data, and for the Web service event data the name is an identifier of the Web service event data and the value is the Web service event data; and
    enabling sharing of the networked application event data and the Web service event data in the consolidated storage, such that:
        a value from the networked application event data may be stored under a Web service event data name; and
        a value from the Web service event data may be stored under a networked application event data name.

21. A system comprising:
    one or more processors;
    memory storing instructions that, responsive to execution by the one or more processors, causes the one or more processors to perform operations comprising:
        receiving, in a first format from a networked application instrumentation module, networked application event data associated with an event of a networked application corresponding to the networked application instrumentation module, the networked application event data also being associated with a session identifier of a session of the networked application;
        receiving, in a second format from a Web service instrumentation module, Web service event data associated with an event of a Web service corresponding to the Web service instrumentation module, the Web service event data also being associated with the session identifier, the second format being a different format than the first format; and
        merging, into a consolidated storage of event data in a common format comprising text, the networked application event data and the Web service event data associated with the session identifier, including storing:
            a value from the networked application event data under a Web service event data name; or
            a value from the Web service event data under a networked application event data name.

22. A system as recited in claim 21, wherein the networked application comprises a client application.

23. A system comprising:
    one or more processors;
    memory storing instructions that, responsive to execution by the one or more processors, causes the one or more processors to perform operations comprising:
        identifying networked application event data associated with a session of a networked application;
        associating, in at least one of the one or more devices, a session identifier of the session with the networked application event data;
        providing, to a first event data collection system, the networked application event data and associated session identifier;
        providing, to a Web service, the session identifier in response to a user request to access the Web service;
        continuing to provide the networked application event data and associated session identifier to the first event data collection system while the Web service provides Web service event data to a second event data collection system; and
        consolidating the networked application event data and Web service event data in a third event data collection system when the networked application event data and the Web service event data are associated with a same session identifier by at least:
            associating an item of the networked application event data with a Web service event, the item of the networked application event data not previously included in Web service event data associated with the Web service event; and
            associating an item of the Web service event data with a networked application event, the item of the Web service event data not previously included in networked application event data associated with the networked application event.

24. A system as recited in claim 23, wherein the networked application comprises a client application.

25. A system comprising:
    one or more processors;
    memory storing instructions that, responsive to execution by the one or more processors, causes the one or more processors to perform operations comprising:
        receiving, in a first format from a networked application instrumentation module and at a networked application event data collection system implemented by at least one of the one or more devices, networked application event data and both a session identifier of a current session of a networked application when a first event corresponding to the networked application event data occurred and a timestamp indicating when the first event occurred;

receiving, in a second format from a Web service instrumentation module and at a Web service event data collection system implemented by at least one of the one or more devices, Web service event data and both the session identifier of the current session of the networked application when a second event corresponding to the Web service event data occurred and a timestamp of when the second event occurred, the session identifier having been received by the Web service from the networked application, the second format being a different format than the first format;

merging the networked application event data and the Web service event data associated with the session identifier into a consolidated storage of event data, the consolidated storage using a common name-value pair format in which for the networked application event data the name is an identifier of the networked application event data and the value is the networked application event data, and for the Web service event data the name is an identifier of the Web service event data and the value is the Web service event data; and enabling sharing of the networked application event data and the Web service event data in the consolidated storage, such that:

a value from the networked application event data may be stored under a Web service event data name; and a value from the Web service event data may be stored under a networked application event data name.

26. A system as recited in claim 25, wherein the networked application comprises a client application.

* * * * *